United States Patent [19]

Cohen

[11] Patent Number: 4,876,766

[45] Date of Patent: Oct. 31, 1989

[54] DECORATIVE FAUCET HANDLE MOUNTING APPARATUS

[76] Inventor: Richard K. Cohen, 2561 Hawthorn, Ann Arbor, Mich. 48104

[21] Appl. No.: 290,573

[22] Filed: Dec. 27, 1988

[51] Int. Cl.$^4$ .............................................. F16K 31/60
[52] U.S. Cl. ...................................... 16/114 R; 16/121;
  16/DIG. 24; 16/DIG. 30; 74/548; 74/553;
  292/347; 292/350; 251/291; 251/292; 403/17
[58] Field of Search ................ 16/114 R, 118, 121,
  16/DIG. 24, DIG. 30; 74/548, 553, 557;
  292/347, 348, 350, DIG. 27; 220/94 R; 403/17,
  299, 359, 362, 342; 251/291, 292

[56] References Cited

U.S. PATENT DOCUMENTS

| | | | |
|---|---|---|---|
| 1,217,132 | 2/1917 | Amos | 251/291 |
| 1,512,702 | 10/1924 | McCarty | 251/291 |
| 2,013,578 | 9/1935 | Pardieck | 292/350 |
| 2,039,917 | 5/1936 | Michel . | |
| 2,660,904 | 12/1953 | Hilsinger, Jr. | 74/553 |
| 2,881,867 | 4/1959 | Mayon | 74/553 |
| 2,898,776 | 8/1959 | Spencer . | |
| 3,024,555 | 3/1962 | Abeles | 292/347 |
| 3,250,148 | 5/1966 | Soles . | |
| 3,396,604 | 8/1968 | Samuels et al. . | |
| 4,306,468 | 12/1981 | Bolgert . | |
| 4,479,736 | 10/1984 | Evans et al. | 16/114 R |
| 4,565,350 | 1/1986 | Rozek . | |
| 4,593,430 | 6/1986 | Spangler et al. . | |
| 4,616,673 | 10/1986 | Bondar | 16/121 |
| 4,716,922 | 1/1988 | Camp | 251/291 |
| 4,747,278 | 5/1988 | Roncelli et al. | 74/557 |
| 4,794,945 | 1/1989 | Reback | 74/553 |

FOREIGN PATENT DOCUMENTS 2735895  2/1979  Fed. Rep. of Germany ........ 74/553

*Primary Examiner*—Richard K. Seidel
*Assistant Examiner*—Edward A. Brown
*Attorney, Agent, or Firm*—Basile and Hanlon

[57] ABSTRACT

A decorative faucet handle mounting apparatus includes an adapter having a first bore complimentrally shaped to the shape of a faucet stem. A second bore formed coaxially in the adapter cooperates with a fastener to attach the adapter to the faucet stem. A decorative handle has a longitudinal bore extending inward from one end which is engageable over the adapter. A perpendicular bore formed in the handle receives a threaded fastener engageable through the perpendicular bore with the adapter to secure the handle to the adapter.

8 Claims, 1 Drawing Sheet

DECORATIVE FAUCET HANDLE MOUNTING APPARATUS

BACKGROUND OF THE INVENTION

FIELD OF THE INVENTION

The present invention relates, in general, to faucets and, specifically, to faucet handles.

Faucets are commonly employed to control the flow of water. In a typical faucet, such as an outdoor faucet, a faucet body containing a flow control valve is mounted in an exterior wall of the building and contains an outlet located exteriorally of the building. A stem connected to the valve extends outward from the faucet body and receives a handle. Rotation of the handle thereby causes rotation of the stem and the valve between open and closed positions.

Faucet stems come in a variety of shapes including a stem having four flat sides arranged in a square, and stems having circumfentially spaced teeth, such as splines or serrations, etc. Handles are formed with an internal bore having a configuration mateable with a particular stem configuration. Any replacement of the handle or the installation of a new handle, such as a decorative handle in the form of a figure, requires matching of the handle bore to the stem configuration.

In order to simplify the installation of handles on faucets, to provide an attractive appearance by covering the handle attachment fastener or to provide a measure of universality in view of the number of different stem configurations, adapters have been employed which mount over the faucet stem and receive a handle thereover. However, such adapters have been complicated in construction and utilize a number of separate parts which results in a high cost.

Thus, it would be desirable to provide an apparatus for mounting a handle on any conventional faucet stem. It would also be desirable to provide an apparatus for mounting a decorative handle on any conventional faucet stem. It would also be desirable to provide a decorative faucet handle mounting apparatus which is of simple construction and low cost. Finally, it would be desirable to provide a kit for mounting a decorative handle to a faucet stem which enables a decorative handle to be mounted on most conventional shaped faucet stems.

SUMMARY OF THE INVENTION

The present invention is a decorative faucet handle mounting apparatus for attaching a decorative faucet handle to a faucet having an outwardly extending, rotatable stem.

The mounting apparatus includes an adapter having a first bore complimentrally shaped to fit in registry over the faucet stem. A second bore is formed in the adapter coaxial with the first bore. In one embodiment, a fastener screw is inserted through the second bore into a longitudinal, threaded bore formed in certain faucet stems to secure the adapter to the faucet stem. In another embodiment, the threaded end of certain types of faucet stems passes through the second bore to receive a nut to secure the adapter to the stem.

A decorative handle is formed with a longitudinal bore extending inward from a base or one end. The handle bore is configured to be disposed in registry over the exterior of the adapter. A second bore is formed in the handle perpendicular to the longitudinal bore and receives a threaded fastener which is threadingly insertable through the second bore in the handle into engagement with the adapter to fixedly secure the handle to the adapter.

In a preferred embodiment, the first bore in the adapter may be provided in any number of shapes so as to be complimentary to the shapes of conventional faucet stems. Thus, in one embodiment, the first bore in the adapter is provided with four, planar sides arranged in a square cross section to mate with a stem having a complimentary shape. In another embodiment, the first bore in the adapter is provided with a circular cross section with a plurality of circumfrentially spaced, radially inwardly extending teeth. The teeth are in the form of serrations or square sided, longitudinally extending splines to mate with correspondingly shaped stems.

The adapter is preferably formed of a relatively soft, ductile material, such as a plastic or a metal, such as zinc. This provides secure engagement with the fastener extending through the handle to securely attach the handle to the adapter for simultaneous rotation.

As a kit, the decorative faucet handle apparatus of the present invention is provided with a decorative handle and a plurality of adapters, each having a first bore formed with a different internal configuration so as to be usable with the most types of faucet stems. This enables a decorative handle to be mounted on any existing faucet regardless of its stem configuration.

The decorative faucet handle mounting apparatus of the present invention provides an easy replacement of or mounting of a decorative handle on an existing faucet. The unique adapter of the present invention provides in a single body or member a mounting attachment fitable over any conventional faucet stem for receiving a faucet handle thereover. This enables a handle having single shaped base with an internal bore to be mounted on any conventional faucet stem regardless of the stem configuration.

The mounting apparatus of the present invention is simple in construction and has a low manufacturing cost. In a kit form, the usage of a plurality of adapters, each configured for a different stem shape, enables the decorative handle to be mounted on any existing faucet.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 2:
FIG. 2 is an enlarged bottom view of the adapter of the decorative faucet handle mounting apparatus shown in FIG. 1.

Throughout the following description and drawings, an identical reference number is used to refer to the same component shown in multiple figures of the drawing.

Figure 1:
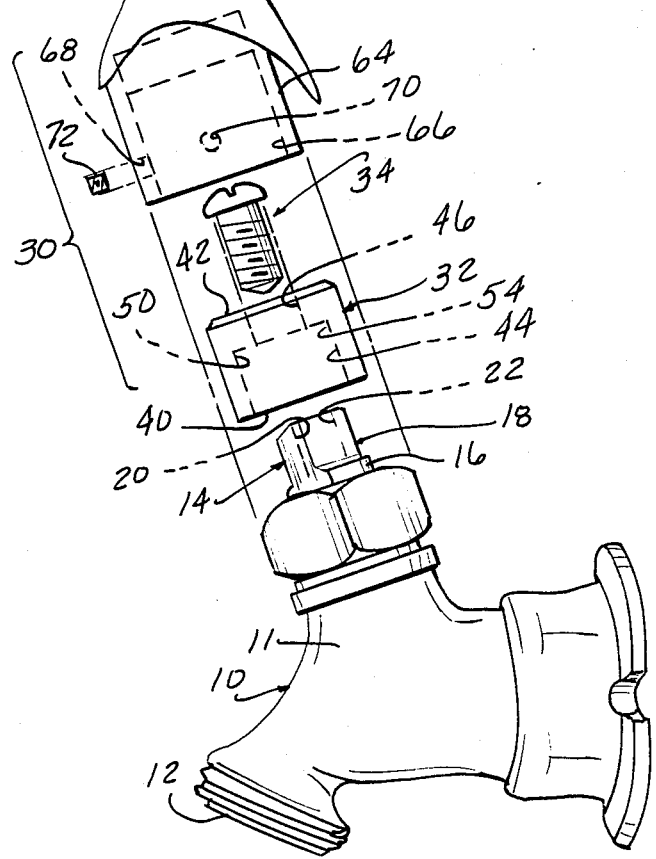
FIG. 1 is an exploded, side elevational view of a decorative faucet handle mounting apparatus of the present invention and a conventional faucet.
Figure 6:
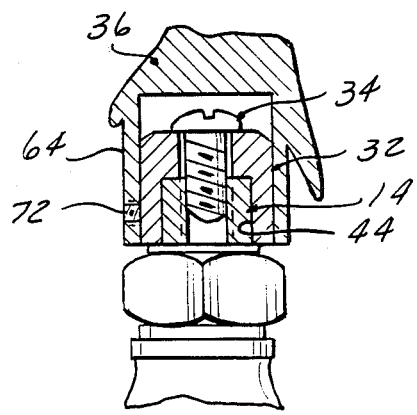
FIG. 6 is a partial cross sectional view illustrating the assembly of the decorative faucet handle mounting apparatus of the present invention on the stem of a conventional faucet.

Referring now to the drawing, and to FIG. 1 in particular, there is illustrated a decorative faucet handle mounting apparatus employed to mount a decorative faucet handle on a conventional water faucet.

By way of background and to clarify the use and advantages of the present invention, a brief description of the construction and operation of a conventional water faucet will be initially provided. Depicted in FIG. 1 is a conventional outdoor-type water faucet 10 which is used to control the flow of water from a water supply, not shown, through an outlet 12. The water flow is controlled by a manually operated valve movable between closed and open positions, which is mounted within the body 11 of the faucet 10. A stem 14 is rotatably mounted in the faucet 10 and is connected to the internally mounted valve. The stem 14 projects outward from the body 11 of the faucet 10 and is manually rotated to move the faucet valve between open and closed positions.

As is well known, the stem 14 of a conventional faucet has a generally cylindrical lower portion 16 with a machined upper end portion denoted in general by reference number 18. The upper portion 18 of the faucet stem 14 is typically provided in a variety of configurations. As shown in FIG. 1, one typical configuration of the stem 14 includes a plurality of flat surfaces, such a four surfaces 20 arranged in a square. Alternately, the upper machined end portion 18 of the stem 14 may be provided with a plurality of circumfrentially spaced, axially extending teeth, not shown. Another typical stem configuration is in the form of circumfrentially spaced, axially extending splines having square edges. The purpose of these various stem configurations is to provide a secure mating surface for the attachment of a handle to the stem. Such handles are provided with an internal bore at one end which has a shape complimentary to the shape of the stem 14 to which it is to be attached. A threaded screw is normally inserted through the handle into a threaded, internal bore 22 formed in certain stems 14 to secure the handle to the stem 14. Alternately, for other types of stems, a nut is threaded over the end of the stem to secure the handle to the stem 14.

The present invention is a decorative faucet handle mounting apparatus denoted by referency number 30. The apparatus includes an adapter 32 and a decorative handle denoted by reference number 36.

One embodiment of the adapter 32 is shown in FIGS. 1 and 2. The adapter 32 is in the form of a body having a generally circular exterior with a first end 40 and a spaced second end 42. A first bore 44 is formed internally within the adapter 32 and extends inward from the first end 40. A second bore 46 is also formed in the adapter 32 and extends inward from the second end 42 coaxially and in communication with the first bore 44. In one embodiment, the second bore 46 receives the fastener 34 which extends therethrough into the threaded bore 22 found in certain stems 14 to secure the adapter 32 to the stem 14. In another embodiment, the threaded end of certain stems passes through the second bore 46 and receives a nut, not shown, to secure the adapter 32 to the stem.

In one embodiment, the first bore 44 in the adapter 32 is formed with four planar faces 48, 50, 52 and 54 arranged in a generally square configuration as shown in FIG. 2. In this configuration, the first bore 44 of the adapter 32 is configured to be slidably insertable in secure, non-movable contact with the complimentrally shaped faces 20 of the stem 14 shown in FIG. 1.

The adapter 32 is preferably formed of a soft, ductile material, such as a plastic, i.e., nylon, or a metal, such as zinc. This enables the fasteners extending through the handle 36 to securely engage the adapter 32, as described hereafter.

The handle 36 may be formed in any decorative shape, such as an inanimate figure. Although a fish is illustrated in FIG. 1 as forming the decorative portions of the handle 36, it will be understood that any other figure, such as a frog, duck, bird, etc., may also be utilized. The decorative handle 36 is formed of any suitable material, such as brass. The handle 36 includes a base portion 64 having an inwardly extending bore 66. The bore 66 has a circular cross section to conform in registry with the exterior of the adapter 32. At least one and preferably two bores 68 and 70 are formed in the base 64 of the decorative handle 36 perpendicular to and in communication with the longitudinal bore 66.

The perpendicular bores 68 and 70 receive threaded fasteners, such as set screws 72, which are threadingly inserted therethrough into contact with the adapter body 32, as described in greater detail hereafter.

Figure 3:
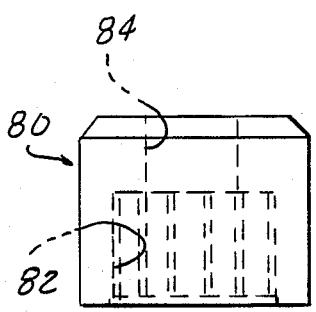
FIG. 3 is an enlarged side elevational view of another embodiment of the adapter employed in the decorative faucet handle mounting apparatus of the present invention.
Figure 4:
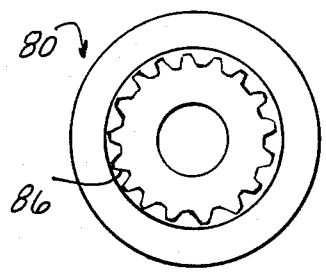
FIG. 4 is a bottom view of the adapter shown in FIG. 3.

Another embodiment of the adapter is illustrated in FIGS. 3 and 4. In this embodiment, an adapter 80 has a generally circular exterior with a first internal bore 82 extending from one end and a second bore 84 coaxially extending from a second end. The first bore 82, in this embodiment, is formed with a plurality of circumfrentially spaced, inwardly extending teeth 86 as shown in FIG. 4. The teeth 86 are configured to meshingly engage correspondingly shaped teeth, not shown, found on a conventional faucet stem to securely attach the adapter 80 to the faucet stem.

Figure 5:
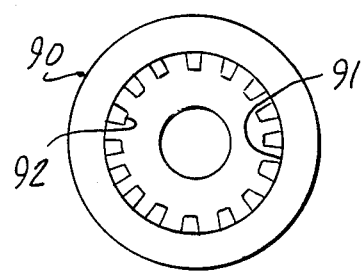
FIG. 5 is a bottom view of another embodiment of the adapter employed in the present invention.

FIG. 5 depicts yet another embodiment of an adapter 90 which is similar to the adapters 32 and 80. In this embodiment, a first bore 91 is provided with a plurality of axially extending, circumfrentially spaced splines 92, each having generally square edges. The splines 92 are configured to mesh with correspondingly shaped splines found on certain faucet stems to non-rotably attach the adapter 90 to such stems.

In using the apparatus of the present invention to mount a decorative handle 36 to a conventional faucet 10, an adapter, such as an adapter 32 having an internal bore configuration complimentary to the shape of the stem 14 of the faucet 10, is slidably inserted over the stem 14. The fastener employed with the stem 14, such as the screw 34, is inserted through the second bore 46 in the adapter 32 into threading engagement with the longitudinal bore 22 in the stem 14 to secure the adapter 32 to the stem 14. The decorative handle 36 is then inserted over the adapter 32. The set screws 72 are threaded through the bores 68 and 70 until the set screws 72 engage the adapter 32 to securely and non-rotatably attach the decorative handle 36 to the adapter 32. Rotation of the handle 36 is then translated through the adapter 32 to rotation of the stem 14 to cause the internal valve of the faucet 32 to open and close depending upon the direction of such rotation.

The decorative faucet handle mounting apparatus 10 of the present invention may also be provided in a kit form which includes a decorative handle 36 and a plurality of adapters, each having different internal bore configurations, such as adapters 32, 80 and 90, so as to be usable with any conventional faucet stem configuration. In use, one of the adapters 32, 80 or 90 is selected which matches the exterior configuration of the faucet stem 14 and is inserted thereover. This enables a decorative handle 36 having a single shaped base and internal longitudinal bore to be attached to any conventional faucet, regardless of the faucet stem configuration.

In summary, there has been disclosed a unique decorative faucet handle mounting apparatus which enables a decorative faucet handle to be mounted on any conventional faucet, regardless of the faucet stem configuration. The unique adapter employed in the present invention is provided in different configurations so as to be usable with any conventional faucet stem configuration. This enables a decorative handle having a single shaped base and internal longitudinal bore to be mounted on any faucet regardless of the specific faucet stem configuration. This minimizes the number of different parts required for mounting faucet handles on faucets which were previously required due to the number of different faucet stem configurations in use. The decorative faucet handle mounting apparatus of the present invention requires a minimum number of components for a low cost.

What is claimed is:

1. A decorative faucet handle assembly for a faucet having an outwardly extending rotatable stem with a longitudinal, threaded bore formed therein, comprising:
   an adapter having a first bore complimentarily shaped to slidably fit in registry over the stem of a faucet;
   a second bore formed in the adapter coaxial with the first bore and forming an extension of the first bore;
   a first fastener means attachable to the faucet stem for fastening the adapter to the stem;
   a decorative handle having a longitudinal handle bore extending inward from one end, the longitudinal handle bore being configured to be disposed in registry over the adapter;
   a second bore formed in the decorative handle perpendicular to the longitudinal handle bore; and
   a second fastener threadingly insertable through the second bore in the decorative handle into engagement with the adapter to secure the decorative handle to the adapter.

2. The apparatus of claim 1 further including two perpendicular bores formed in the decorative handle and two second fasteners threadingly insertable through each of the second perpendicular bores in the decorative handle.

3. The apparatus of claim 1 wherein the first bore in the adapter is formed with a plurality of flat faces arranged in square cross section and matable with correspondingly arranged flat faces of a faucet stem.

4. The apparatus of claim 1 wherein the first bore includes a plurality of circumferentially spaced teeth matable with circumferentially spaced teeth formed on a faucet stem.

5. The apparatus of claim 4 wherein the circumfrentially spaced teeth are splines.

6. The apparatus of claim 1 wherein the adapter is formed of a ductile material.

7. The apparatus of claim 1 wherein:
   the adapter has a circular exterior; and
   the longitudinal handle bore in the decorative handle has a circular cross section slidably disposable over the exterior of the adapter.

8. A decorative faucet handle assembly kit for mounting a decorative faucet handle on a faucet having an outwardly extending, rotatable stem with a longitudinal threaded bore formed therein, the kit comprising:
   a plurality of adapters, each having first and second coaxial bores;
   a decorative handle having a longitudinal handle bore extending inward from one end, the longitudinal handle bore in the decorative handle being configured to be disposed in registry over the selected one of the adapters;
   a second bore formed in the decorative handle perpendicular to the longitudinal handle bore;
   a fastener threadingly insertable through the second bore in the decorative handle into engagement with the selected one of the adapters to secure the decorative handle to the selected one of the adapters; and
   wherein each of the plurality of adapters has a first bore formed of a shape selected from the group comprising a plurality of flat faces arranged in a square and a plurality of circumferentially spaced, longitudinally extending teeth arranged in a circle.

* * * * *